(12) United States Patent
Yokoyama et al.

(10) Patent No.: US 8,205,706 B2
(45) Date of Patent: Jun. 26, 2012

(54) SWING ARM PIVOT STRUCTURE FOR MOTORCYCLE

(75) Inventors: Takeo Yokoyama, Saitama (JP); Yoshiyuki Kurayoshi, Saitama (JP); Masashi Hagimoto, Saitama (JP); Makoto Oono, Saitama (JP); Makoto Nagayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 12/877,634

(22) Filed: Sep. 8, 2010

(65) Prior Publication Data

US 2011/0074129 A1    Mar. 31, 2011

(30) Foreign Application Priority Data

Sep. 30, 2009    (JP) .................................. 2009-227595

(51) Int. Cl.
*B60G 3/12*    (2006.01)
(52) U.S. Cl. ........................................................ 180/227
(58) Field of Classification Search .................. 180/219, 180/220, 227
See application file for complete search history.

(56) References Cited

U.S. PATENT DOCUMENTS

| | | | |
|---|---|---|---|
| 6,024,185 A * | 2/2000 | Okada et al. | 180/227 |
| 6,189,638 B1 * | 2/2001 | Ito et al. | 180/227 |
| 6,253,868 B1 * | 7/2001 | Horii et al. | 180/227 |
| 6,450,282 B1 * | 9/2002 | Gogo et al. | 180/219 |
| 6,913,101 B2 * | 7/2005 | Uneta et al. | 180/227 |
| 7,665,563 B2 * | 2/2010 | Misaki et al. | 180/227 |
| 7,730,988 B2 * | 6/2010 | Igarashi et al. | 180/227 |
| 7,757,801 B2 * | 7/2010 | Toyoda | 180/227 |
| 2006/0278458 A1 * | 12/2006 | Toyoda | 180/227 |

FOREIGN PATENT DOCUMENTS

| | | |
|---|---|---|
| EP | 1 642 817 A2 | 4/2006 |
| JP | 2006-96272 A | 4/2006 |
| JP | 2006-264460 A | 10/2006 |

* cited by examiner

*Primary Examiner* — Tony Winner
(74) *Attorney, Agent, or Firm* — Birch, Stewart, Kolasch & Birch, LLP

(57) ABSTRACT

To provide a swing arm pivot structure for a motorcycle which can prevent rubbing between a swing arm and a body frame with a simple structure and can reduce a manufacturing cost for the motorcycle. The swing arm pivot structure includes a swing arm for supporting a rear wheel, a pivot shaft mounted to a body frame and inserted through a swing arm pivot of the swing arm, a first bearing located between one end portion of the swing arm pivot and the body frame for pivotably supporting the swing arm, a first collar located between the inner circumference of the first bearing and the pivot shaft, and a second collar located between the first collar and the body frame. The second collar has a rigidity different from the rigidity of the first collar and the body frame.

17 Claims, 3 Drawing Sheets

SWING ARM PIVOT STRUCTURE FOR MOTORCYCLE

CROSS-REFERENCE TO RELATED APPLICATIONS

This application claims priority under 35 U.S.C. §119(a) to Application No. 2009-227595, filed in Japan on Sep. 30, 2009, the entirety of which is expressly incorporated herein by reference.

BACKGROUND OF THE INVENTION

1. Field of the Invention

The present invention relates to a swing arm pivot structure for a motorcycle.

2. Description of Background Art

A conventional swing arm pivot structure for a motorcycle known in the art includes a pivot shaft threadedly engaged with a body frame and a nut member threadedly engaged with the pivot shaft, wherein the nut member is engageable with the body frame so as to be unmovable in one axial direction (see Japanese Patent Laid-Open No. 2006-96272, for example).

Another conventional swing arm pivot structure for a motorcycle known in the art includes a pivot shaft supported at its central portion to a through hole of an engine and a pair of collars mounted on the pivot shaft on the opposite sides of the central portion for rotatably supporting a swing arm, wherein a pair of large-diameter holes are formed at the opposite ends of the through hole of the engine, each large-diameter hole having a diameter larger than that of the through hole, and each collar is provided at its one end with an engaging portion for engaging each large-diameter hole (see Japanese Patent Laid-Open No. 2006-264460, for example).

In the swing arm pivot structure described in Japanese Patent Laid-Open No. 2006-96272, a tapered bearing is used to prevent rubbing between the swing arm and the body frame in swinging the swing arm, so that there is a possibility of an increase in manufacturing cost.

In the swing arm pivot structure described in Japanese Patent Laid-Open No. 2006-264460, the plural collars are required to prevent rubbing between the swing arm and the body frame, and the through hole for insertion of the pivot shaft must be formed in the engine. Accordingly, the structure is complicated to cause the possibility of an increase in manufacturing cost.

SUMMARY OF THE INVENTION

It is accordingly an object of the present invention to provide a swing arm pivot structure for a motorcycle which can prevent rubbing between a swing arm and a body frame with a simple structure and can reduce a manufacturing cost for the motorcycle.

In accordance with a first aspect of the present invention, there is provided a swing arm pivot structure for a motorcycle having a swing arm for supporting a rear wheel and a pivot shaft mounted to a body frame and inserted through a swing arm pivot of the swing arm, the swing arm pivot structure including a first bearing located between one end portion of the swing arm pivot and the body frame for pivotably supporting the swing arm; a first collar located between the inner circumference of the first bearing and the pivot shaft; and a second collar located between the first collar and the body frame, wherein the second collar has a rigidity different from the rigidity of the first collar and the body frame.

In accordance with a second aspect of the present invention, the second collar is press-fitted to the body frame, and the first collar is engaged with the inner circumferential surface of the second collar.

In accordance with a third aspect of the present invention, the first collar and the second collar have radially extending flanges; and the flange of the first collar and the flange of the second collar have radially extending surfaces opposed to each other, the radially extending surfaces being in surface contact with each other so as to allow contact pressures against each other.

In accordance with a fourth aspect of the present invention, the swing arm pivot structure further includes a second bearing located between the other end portion of the swing arm pivot and the body frame for pivotably supporting the swing arm; a third collar located between the inner circumference of the second bearing and the pivot shaft; and a fourth collar located between the third collar and the body frame, wherein the fourth collar has a rigidity different from the rigidity of the third collar and the body frame, and the third collar and the fourth collar are engaged with each other between the body frame and the swing arm pivot so as to produce an axial coupling force between the third collar and the fourth collar.

In accordance with a fifth aspect of the present invention, a space is defined between the body frame and the swing arm pivot; and the pivot shaft is inserted through the third collar after inserting the third collar into the swing arm pivot, the fourth collar being coupled to the third collar by screwing the fourth collar with a nut.

The swing arm pivot structure according to the first aspect of the present invention includes the first bearing located between one end portion of the swing arm pivot and the body frame for pivotably supporting the swing arm, the first collar located between the inner circumference of the first bearing and the pivot shaft, and the second collar located between the first collar and the body frame, wherein the second collar has a rigidity different from the rigidity of the first collar and the body frame. Accordingly, rubbing between the swing arm pivot and the body frame can be prevented with a simple structure. Further, since the structure is simple, a manufacturing cost for the motorcycle can be reduced.

In the swing arm pivot structure according to the second aspect of the present invention, the second collar is press-fitted to the body frame, and the first collar is engaged with the inner circumference of the second collar. Accordingly, wearing of the first collar to the body frame can be prevented, so that the swinging accuracy of the swing arm can be improved.

In the swing arm pivot structure according to the third aspect of the present invention, the first collar and the second collar have radially extending flanges, the flange of the first collar and the flange of the second collar have radially extending surfaces opposed to each other, and these radially extending surfaces are in surface contact with each other so as to allow contact pressures against each other. Accordingly, wearing of the first and second collars can be prevented.

The swing arm pivot structure according to the fourth aspect of the present invention includes the second bearing located between the other end portion of the swing arm pivot and the body frame for pivotably supporting the swing arm, the third collar located between the inner circumference of the second bearing and the pivot shaft, and the fourth collar located between the third collar and the body frame, wherein the fourth collar has a rigidity different from the rigidity of the third collar and the body frame, and the third collar and the fourth collar are engaged with each other between the body frame and the swing arm pivot so as to produce an axial coupling force between the third collar and the fourth collar.

Accordingly, it is possible to prevent that a force having a cutting direction may be applied to a shaft hole of the body frame for insertion of the pivot shaft.

In the swing arm pivot structure according to the fifth aspect of the present invention, the space is defined between the body frame and the swing arm pivot, and the pivot shaft is inserted through the third collar after inserting the third collar into the swing arm pivot, wherein the fourth collar is coupled to the third collar by screwing the fourth collar with the nut. Accordingly, the mountability of the swing arm can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
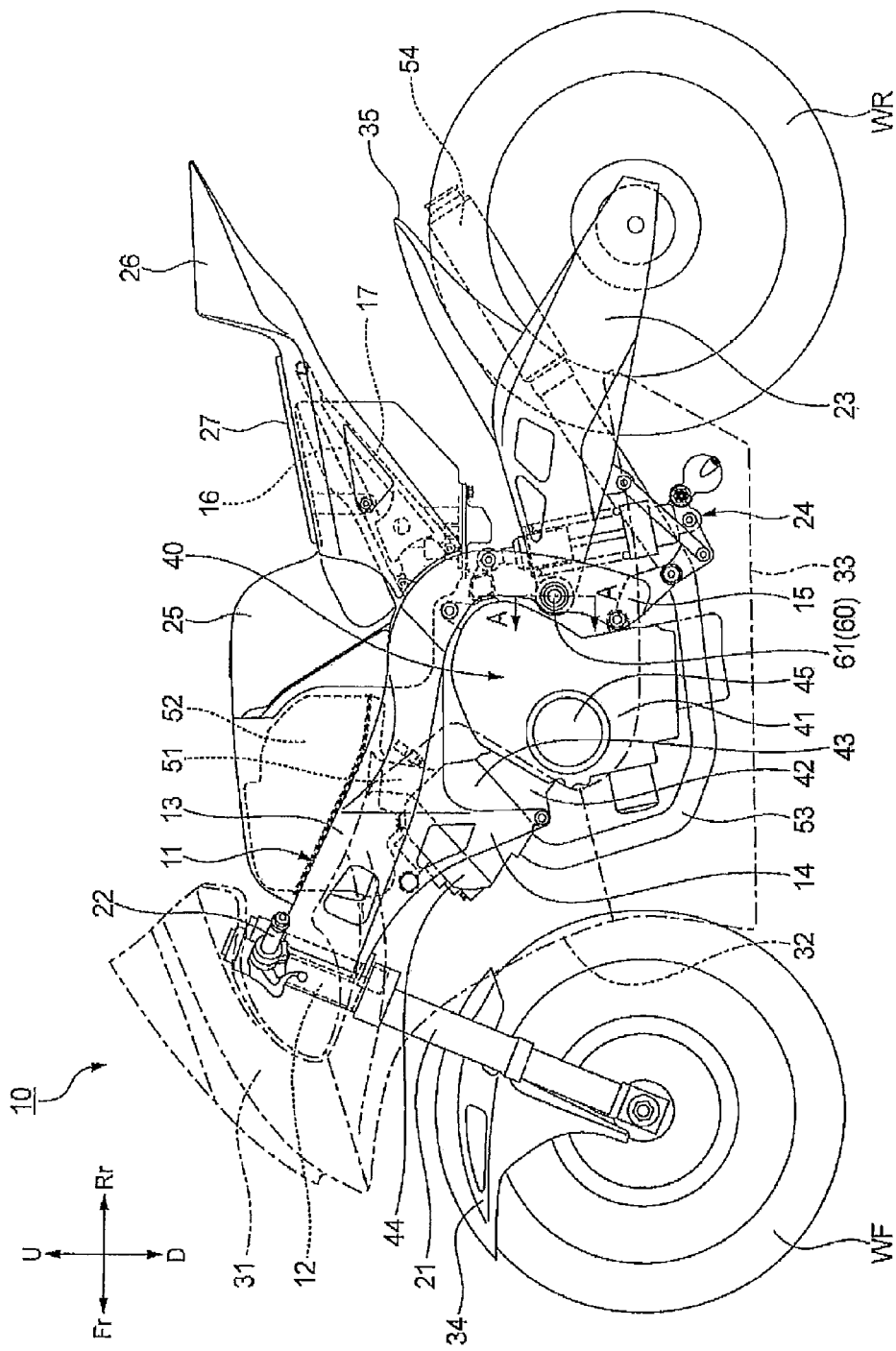
FIG. 1 is a left side view of a motorcycle adopting a preferred embodiment of the swing arm pivot structure according to the present invention.

The present invention will now be described with reference to the accompanying drawings, wherein the same reference numerals have been used to identify the same or similar elements throughout the several views. The orientation of each drawing is the same as that of the reference symbols included therein. In the following description, the terms in relation to directions, such as front, rear, right, left, upper, and lower are the same as those viewed from an operator riding on the vehicle. Further, in the drawings, the arrow Fr identifies the front side of the vehicle, the arrow Rr identifies the rear side of the vehicle, the arrow R identifies the right side of the vehicle, the arrow L identifies the left side of the vehicle, the arrow U identifies the upper side of the vehicle, and the arrow D identifies the lower side of the vehicle.

In FIG. 1, reference symbol 10 generally identifies a motorcycle in this preferred embodiment. The motorcycle 10 has a body frame 11. The body frame 11 is composed of a head pipe 12 forming a front end member, a pair of right and left main frames 13 extending rearward from the head pipe 12 so as to be inclined downward, a pair of right and left engine hangers 14 extending downward from the lower surfaces of the front portions of the right and left main frames 13, a pair of right and left pivot plates 15 connected to the rear ends of the right and left main frames 13 and extending downward, a pair of right and left seat rails 16 connected to the upper portions of the right and left pivot plates 15 and extending rearward so as to be inclined upward, and a pair of right and left sub frames 17 connected to the upper portions of the right and left pivot plates 15 and extending rearward so as to be inclined upward, wherein the rear ends of the right and left sub frames 17 are connected to the rear ends of the right and left seat rails 16. An engine 40 is provided below the right and left main frames 13 and mounted to the engine hangers 14 and the pivot plates 15.

The motorcycle 10 further includes a front fork 21 steerably supported to the head pipe 12, a front wheel WF rotatably supported to the lower ends of the front fork 21, a steering handle 22 mounted to the upper end of the front fork 21, a swing arm 23 pivotably supported to the right and left pivot plates 15, a rear wheel WR rotatably supported to the rear ends of the swing arm 23, a rear suspension 24 provided between the swing arm 23 and the pivot plates 15, a fuel tank 25 provided above the engine 40 so as to be interposed between the right and left main frames 13, a seat cowl 26 mounted to the right and left seat rails 16, and an operator seat 27 provided on the seat cowl 26. The motorcycle 10 further includes a front cowl 31, front side cowl 32, under cowl 33, front fender 34, and rear fender 35.

As shown in FIG. 1, the engine 40 includes a crankcase 41, a cylinder block 42 mounted on the crankcase 41 at a front upper portion thereof, a cylinder head 43 mounted on the upper end of the cylinder block 42, a cylinder head cover 44 mounted on the upper end of the cylinder head 43, a generator cover 45 mounted on the left side surface of the crankcase 41, and a clutch cover (not shown) mounted on the right side surface of the crankcase 41.

As shown in FIG. 1, an air cleaner 52 is connected through a throttle body 51 to an intake port (not shown) formed in a rear portion of the cylinder head 43. Further, a muffler 54 is connected through an exhaust pipe 53 to an exhaust port (not shown) formed in a front portion of the cylinder head 43.

Figure 2:
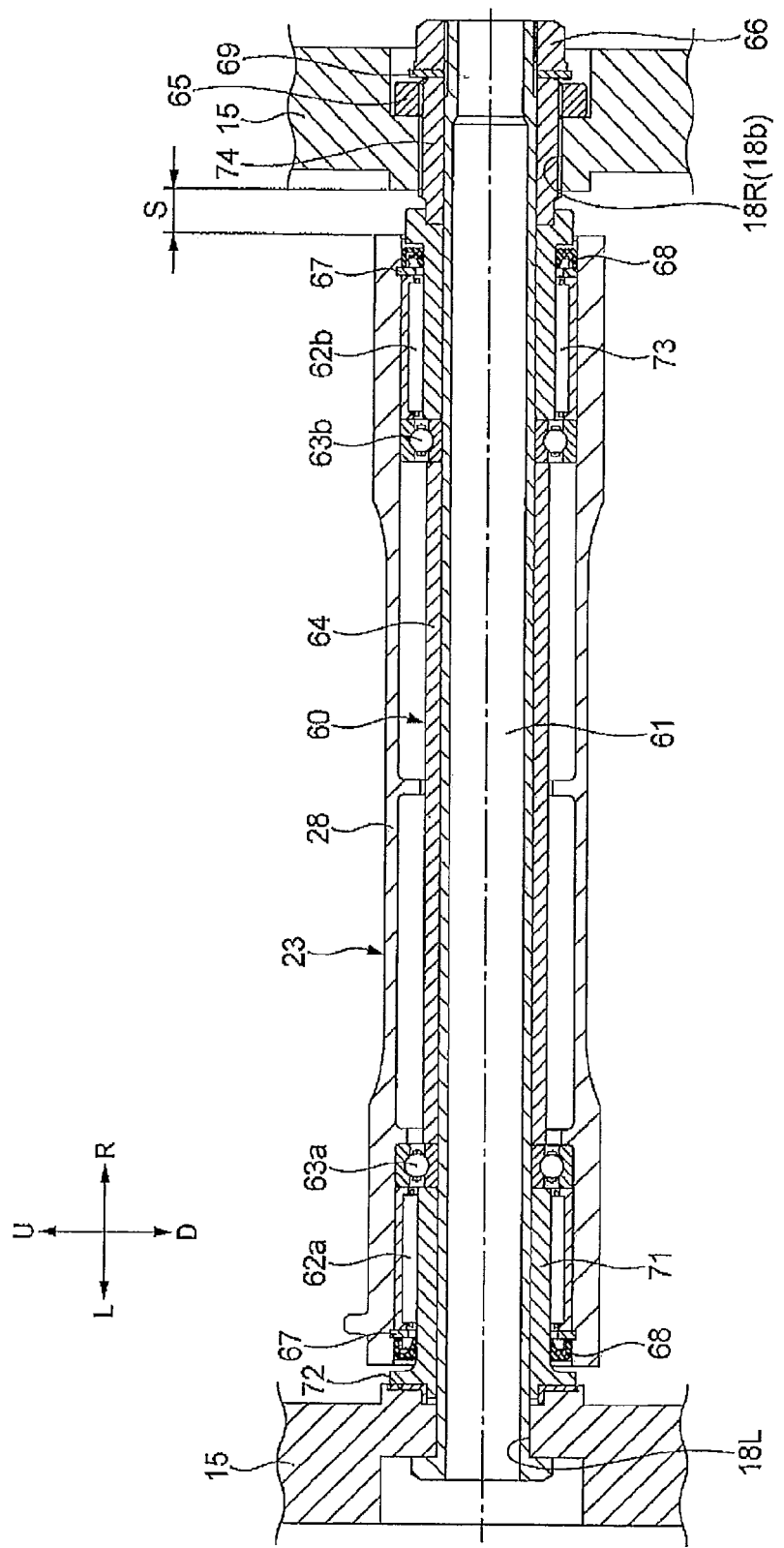
FIG. 2 is a cross section taken along the line A-A in FIG. 1.

As shown in FIG. 2, the left pivot plate 15 has a pivot hole 18L, the right pivot plate 15 has a pivot hole 18R, and the swing arm 23 has a pivot pipe (swing arm pivot) 28. A swing arm supporting mechanism 60 for pivotably supporting the swing arm 23 is provided between the pivot holes 18L and 18R and the pivot pipe 28.

Figure 3:
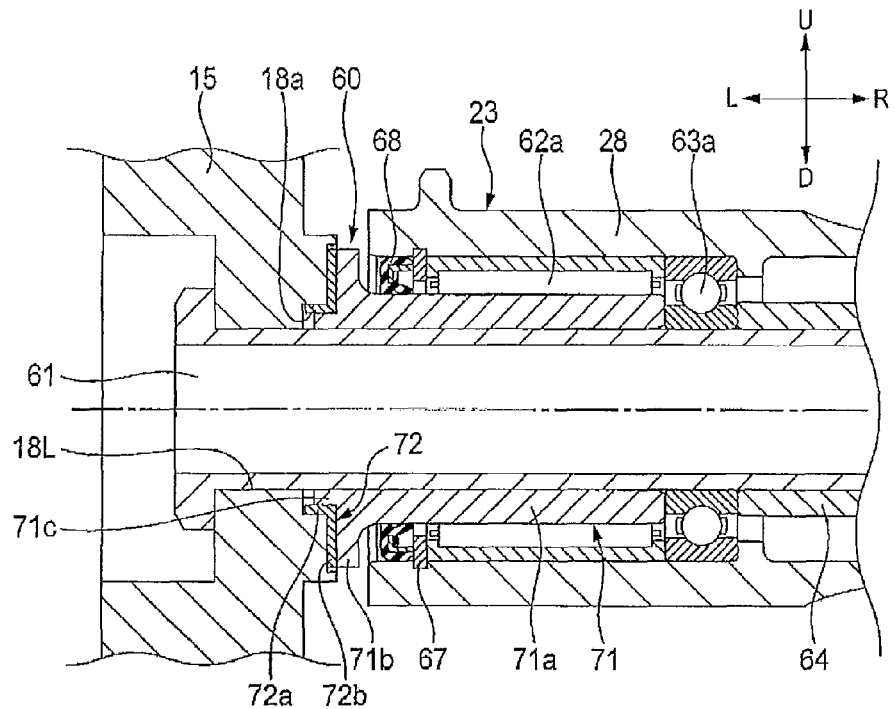
FIG. 3 is an enlarged sectional view of a left portion of the swing arm pivot structure shown in FIG. 2, including a first collar and a second collar.
Figure 4:
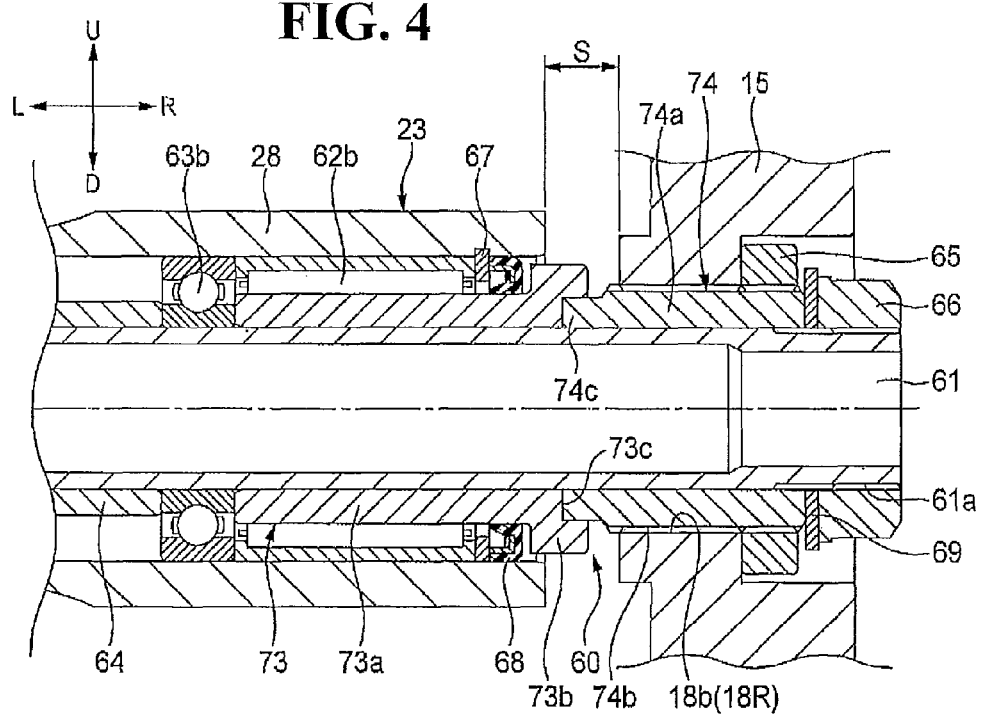
FIG. 4 is an enlarged sectional view of a right portion of the swing arm pivot structure shown in FIG. 2, including a third collar and a fourth collar.

As shown in FIGS. 2 to 4, the swing arm supporting mechanism 60 includes a pivot shaft 61 inserted through the pivot holes 18L and 18R and the pivot pipe 28, a first needle bearing 62a and a first ball bearing 63a both located between the left end portion of the pivot pipe 28 and the pivot shaft 61 for pivotably supporting the swing arm 23, a second needle bearing 62b and a second ball bearing 63b both located between the right end portion of the pivot pipe 28 and the pivot shaft 61 for pivotably supporting the swing arm 23, a first collar 71 located between the inner circumference of the first needle bearing 62a and the pivot shaft 61, a second collar 72 located between the first collar 71 and the left pivot plate 15, a third collar 73 located between the inner circumference of the second needle bearing 62b and the pivot shaft 61, a fourth collar 74 located between the third collar 73 and the right pivot plate 15, a cylindrical spacer 64 located between the first ball bearing 63a and the second ball bearing 63b, a lock nut 65 for fixing the fourth collar 74 to the right pivot plate 15, and a nut 66 for fastening the pivot shaft 61 to the pivot plates 15. The swing arm supporting mechanism 60 further includes snap rings 67, seal members 68, and a washer 69.

As shown in FIG. 3, the laterally inside surface of the left pivot plate 15 is formed with an annular recess 18a concentric with the pivot hole 18L. The second collar 72 is composed of a cylindrical portion 72a press-fitted in the annular recess 18a of the left pivot plate 15 and an annular flange 72b extending radially outwardly from the axially inner end of the cylindrical portion 72a.

As shown in FIG. 3, the first collar 71 is composed of a cylindrical portion 71a located between the first needle bearing 62a and the pivot shaft 61, an annular flange 71b extending radially outwardly from the axially outer end of the cylindrical portion 71a, and a cylindrical engaging portion 71c extending axially outwardly from the inner circumference of the flange 71b and engaging with the inner circumferential surface of the cylindrical portion 72a of the second collar 72.

In this preferred embodiment, the laterally outside surface (radially extending surface) of the flange 71b of the first collar 71 is in surface contact with the laterally inside surface (radially extending surface) of the flange 72b of the second collar 72 so as to allow contact pressures against each other.

In this preferred embodiment, the second collar 72 is formed of a material more rigid than the materials of the first collar 71 and the left pivot plate 15. More specifically, the first collar 71 is formed of iron, the left pivot plate 15 is formed of aluminum, and the second collar 72 is formed of titanium.

As shown in FIG. 4, the third collar 73 is composed of a cylindrical portion 73a located between the second needle bearing 62b and the pivot shaft 61, an annular flange 73b extending radially outwardly from the axially outer end of the cylindrical portion 73a, and an annular engaging recess 73c formed on the laterally outside surface of the flange 73b so as to be concentric with the cylindrical portion 73a.

As shown in FIG. 4, the inner circumferential surface of the pivot hole 18R of the right pivot plate 15 is formed with an internally threaded portion 18b. The fourth collar 74 is composed of a cylindrical portion 74a having an outer circumferential surface formed with an externally threaded portion 74b and an engaging portion 74c formed at the axially inner end of the cylindrical portion 74a. The externally threaded portion 74b of the cylindrical portion 74a of the fourth collar 74 is engaged with the internally threaded portion 18b of the pivot hole 18R of the right pivot plate 15. The engaging portion 74c of the fourth collar 74 is engaged with the engaging recess 73c of the third collar 73. Accordingly, by engaging the engaging portion 74c of the fourth collar 74 into the engaging recess 73c of the third collar 73 and engaging the externally threaded portion 74b of the fourth collar 74 into the internally threaded portion 18b of the pivot hole 18R, an axial coupling force is produced between the third collar 73 and the fourth collar 74. Further, the engaging position of the fourth collar 74 to the right pivot plate 15 is set by the lock nut 65.

As shown in FIGS. 2 and 4, a space S is defined between the right end surface of the pivot pipe 28 and the laterally inside surface of the right pivot plate 15. This space S can be adjusted by changing the amount of engagement between the externally threaded portion 74b of the fourth collar 74 and the internally threaded portion 18b of the pivot hole 18R.

In this preferred embodiment, the fourth collar 74 is formed of a material more rigid than the materials of the third collar 73 and the right pivot plate 15. More specifically, the third collar 73 is formed of iron, the right pivot plate 15 is formed of aluminum, and the fourth collar 74 is formed of titanium.

The swing arm 23 is mounted to the right and left pivot plates 15 in the following manner. First, all of the first collar 71, the third collar 73, the first needle bearing 62a, the second needle bearing 62b, the first ball bearing 63a, the second ball bearing 63b, the spacer 64, the snap rings 67, and the seal members 68 are mounted into the pivot pipe 28 of the swing arm 23. Thereafter, the pivot pipe 28 is located between the pivot holes 18R and 18L of the right and left pivot plates 15, and the engaging portion 71c of the first collar 71 is engaged into the cylindrical portion 72a of the second collar 72 fitted to the annular recess 18a of the left pivot plate 15. Thereafter, the pivot shaft 61 is inserted into the pivot hole 18L, the first collar 71, the first ball bearing 63a, the spacer 64, the second ball bearing 63b, and the third collar 73 in this order from the left side of the vehicle. Thereafter, the fourth collar 74 is fitted to the right end portion of the pivot shaft 61 projecting from the third collar 73. Simultaneously, the externally threaded portion 74b of the fourth collar 74 is engaged with the internally threaded portion 18b of the pivot hole 18R until the engaging portion 74c of the fourth collar 74 comes into full engagement with the engaging recess 73c of the third collar 73. Thereafter, the fourth collar 74 is further screwed into the internally threaded portion 18b to thereby adjust the space S, and the lock nut 65 is next engaged with the externally threaded portion 74b of the fourth collar 74 to thereby set the engaging position of the fourth collar 74 to the right pivot plate 15. Thereafter, the nut 66 is engaged with an externally threaded portion 61a formed at the right end portion of the pivot shaft 61 to thereby fix the pivot shaft 61.

As described above, the swing arm pivot structure according to this preferred embodiment includes the first needle bearing 62a located between the left end portion of the pivot pipe 28 and the left pivot plate 15 for pivotably supporting the swing arm 23, the first collar 71 located between the inner circumference of the first needle bearing 62a and the pivot shaft 61, and the second collar 72 located between the first collar 71 and the left pivot plate 15, wherein the second collar 72 has rigidity different from those of the first collar 71 and the left pivot plate 15. Accordingly, rubbing between the pivot pipe 28 and the left pivot plate 15 can be prevented with a simple structure. Further, since the structure is simple, a manufacturing cost for the motorcycle 10 can be reduced.

In this swing arm pivot structure, the second collar 72 is press-fitted to the left pivot plate 15, and the engaging portion 71c of the first collar 71 is engaged with the inner circumferential surface of the cylindrical portion 72a of the second collar 72. Accordingly, wearing of the first collar 71 to the left pivot plate 15 can be prevented, so that the swinging accuracy of the swing arm 23 can be improved.

In this swing arm pivot structure, the flange 71b of the first collar 71 and the flange 72b of the second collar 72 have radially extending surfaces opposed to each other, and these radially extending surfaces are in surface contact with each other so as to allow contact pressures against each other. Accordingly, wearing of the collars 71 and 72 can be prevented.

This swing arm pivot structure further includes the second needle bearing 62b located between the right end portion of the pivot pipe 28 and the right pivot plate 15 for pivotably supporting the swing arm 23, the third collar 73 located between the inner circumference of the second needle bearing 62b and the pivot shaft 61, and the fourth collar 74 located between the third collar 73 and the right pivot plate 15, wherein the fourth collar 74 has rigidity different from those of the third collar 73 and the right pivot plate 15, and the third collar 73 and the fourth collar 74 are engaged with each other between the right pivot plate 15 and the pivot pipe 28 so as to produce an axial coupling force between the third collar 73 and the fourth collar 74. Accordingly, it is possible to prevent that a force having a cutting direction may be applied to the pivot hole 18R of the right pivot plate 15.

In this swing arm pivot structure, the space S is defined between the right pivot plate 15 and the pivot pipe 28, and the pivot shaft 61 is inserted through the third collar 73 after inserting the third collar 73 into the pivot pipe 28, wherein the fourth collar 74 is coupled to the third collar 73 by screwing the fourth collar 74 with the lock nut 65. Accordingly, the mountability of the swing arm 23 can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm pivot structure for a motorcycle having a swing arm for supporting a rear wheel and a pivot shaft mounted to a body frame and inserted through a swing arm pivot of said swing arm, said swing arm pivot structure comprising:
   a first bearing located between one end portion of said swing arm pivot and said body frame for pivotably supporting said swing arm;
   a first collar located between the inner circumference of said first bearing and said pivot shaft; and
   a second collar located between said first collar and said body frame,
   wherein said second collar has a rigidity different from the rigidity of said first collar and said body frame, and
   wherein said second collar is press-fitted to said body frame, and said first collar is engaged with an inner circumferential surface of said second collar.

2. The swing arm pivot structure for the motorcycle according to claim 1, wherein said first collar and said second collar have radially extending flanges, and said flange of said first collar and said flange of said second collar have radially extending surfaces opposed to each other, said radially extending surfaces being in surface contact with each other so as to allow contact pressures against each other.

3. The swing arm pivot structure for the motorcycle according to claim 1, further comprising:
   a second bearing located between the other end portion of said swing arm pivot and said body frame for pivotably supporting said swing arm;
   a third collar located between the inner circumference of said second bearing and said pivot shaft; and
   a fourth collar located between said third collar and said body frame,
   wherein said fourth collar has a rigidity different from the rigidity of said third collar and said body frame, and said third collar and said fourth collar are engaged with each other between said body frame and said swing arm pivot so as to produce an axial coupling force between said third collar and said fourth collar.

4. The swing arm pivot structure for the motorcycle according to claim 3, wherein a space is defined between said body frame and said swing arm pivot, and said pivot shaft is inserted through said third collar after inserting said third collar into said swing arm pivot, said fourth collar being coupled to said third collar by screwing said fourth collar with a nut.

5. The swing arm pivot structure for the motorcycle according to claim 4, wherein said fourth collar includes an externally threaded portion that is threadably engaged within an internally threaded portion of a pivot hole of the body frame, and said space can be adjusted by changing the amount of engagement between the externally threaded portion of the fourth collar and the internally threaded portion of the pivot hole.

6. The swing arm pivot structure for the motorcycle according to claim 3, wherein said first bearing further comprises:
   a first needle bearing located between said one end portion of said swing arm and said first collar; and
   a first ball bearing located between said one end portion of said swing arm and said pivot shaft, and
   said second bearing further comprises:
   a second needle bearing located between said other end portion of said swing arm and said third collar; and
   a second ball bearing located between said other end portion of said swing arm and said pivot shaft.

7. The swing arm pivot structure for the motorcycle according to claim 1, wherein said first bearing further comprises:
   a first needle bearing located between said one end portion of said swing arm and said first collar; and
   a first ball bearing located between said one end portion of said swing arm and said pivot shaft.

8. The swing arm pivot structure for the motorcycle according to claim 1, wherein said first collar further comprises:
   a cylindrical portion located between said first bearing and said pivot shaft;
   an annular flange extending radially outwardly from an axially outer end of the cylindrical portion; and
   a cylindrical engaging portion extending axially outwardly from an inner circumference of the annular flange,
   wherein said cylindrical engaging portion engages with an inner circumferential surface of a cylindrical portion of the second collar.

9. A motorcycle, comprising:
   a body frame;
   a swing arm for supporting a rear wheel, said swing arm including a swing arm pivot;
   a pivot shaft mounted to the body frame and inserted through said swing arm pivot of said swing arm for rotatably supporting the swing arm to the body frame;
   a first bearing located between one end portion of said swing arm pivot and said body frame for pivotably supporting said swing arm;
   a first collar located between the inner circumference of said first bearing and said pivot shaft; and
   a second collar located between said first collar and said body frame,
   wherein said second collar has a rigidity different from the rigidity of said first collar and said body frame, and
   wherein said second collar is press-fitted to said body frame, and said first collar is engaged with an inner circumferential surface of said second collar.

10. The motorcycle according to claim 9, wherein said first collar and said second collar have radially extending flanges, and said flange of said first collar and said flange of said second collar have radially extending surfaces opposed to each other, said radially extending surfaces being in surface contact with each other so as to allow contact pressures against each other.

11. The motorcycle according to claim 9, further comprising:
   a second bearing located between the other end portion of said swing arm pivot and said body frame for pivotably supporting said swing arm;
   a third collar located between the inner circumference of said second bearing and said pivot shaft; and
   a fourth collar located between said third collar and said body frame,
   wherein said fourth collar has a rigidity different from the rigidity of said third collar and said body frame, and said third collar and said fourth collar are engaged with each other between said body frame and said swing arm pivot so as to produce an axial coupling force between said third collar and said fourth collar.

12. The motorcycle according to claim 11, wherein a space is defined between said body frame and said swing arm pivot, and said pivot shaft is inserted through said third collar after inserting said third collar into said swing arm pivot, said fourth collar being coupled to said third collar by screwing said fourth collar with a nut.

13. The motorcycle according to claim 12, wherein said fourth collar includes an externally threaded portion that is threadably engaged within an internally threaded portion of a pivot hole of the body frame, and said space can be adjusted by changing the amount of engagement between the externally threaded portion of the fourth collar and the internally threaded portion of the pivot hole.

14. The motorcycle according to claim 11, wherein said first bearing further comprises:
   a first needle bearing located between said one end portion of said swing arm and said first collar; and
   a first ball bearing located between said one end portion of said swing arm and said pivot shaft, and
   said second bearing further comprises:
   a second needle bearing located between said other end portion of said swing arm and said third collar; and
   a second ball bearing located between said other end portion of said swing arm and said pivot shaft.

15. The motorcycle according to claim 9, wherein said first bearing further comprises:
   a first needle bearing located between said one end portion of said swing arm and said first collar; and
   a first ball bearing located between said one end portion of said swing arm and said pivot shaft.

16. The motorcycle according to claim 9, wherein said first collar further comprises:
   a cylindrical portion located between said first bearing and said pivot shaft;
   an annular flange extending radially outwardly from an axially outer end of the cylindrical portion; and
   a cylindrical engaging portion extending axially outwardly from an inner circumference of the annular flange,
   wherein said cylindrical engaging portion engages with an inner circumferential surface of a cylindrical portion of the second collar.

17. A swing arm pivot structure for a motorcycle having a swing arm for supporting a rear wheel and a pivot shaft mounted to a body frame and inserted through a swing arm pivot of said swing arm, said swing arm pivot structure comprising:
   a first bearing located between one end portion of said swing arm pivot and said body frame for pivotably supporting said swing arm;
   a first collar located between the inner circumference of said first bearing and said pivot shaft;
   a second collar located between said first collar and said body frame, wherein said second collar has a rigidity different from the rigidity of said first collar and said body frame;
   a second bearing located between the other end portion of said swing arm pivot and said body frame for pivotably supporting said swing arm;
   a third collar located between the inner circumference of said second bearing and said pivot shaft; and
   a fourth collar located between said third collar and said body frame,
   wherein said fourth collar has a rigidity different from the rigidity of said third collar and said body frame, and said third collar and said fourth collar are engaged with each other between said body frame and said swing arm pivot so as to produce an axial coupling force between said third collar and said fourth collar.

* * * * *